(12) United States Patent
Rademacher et al.

(10) Patent No.: US 7,577,601 B1
(45) Date of Patent: Aug. 18, 2009

(54) LEVERAGE MARGIN MONITORING AND MANAGEMENT

(75) Inventors: Robert Rademacher, Lincolnshire, IL (US); David Adkisson, Glenview, IL (US); David Maloy, Sleepy Hollow, NY (US)

(73) Assignee: UBS AG, Zurich (CH)

( * ) Notice: Subject to any disclaimer, the term of this patent is extended or adjusted under 35 U.S.C. 154(b) by 644 days.

(21) Appl. No.: 09/597,881

(22) Filed: Jun. 20, 2000

Related U.S. Application Data

(60) Provisional application No. 60/193,187, filed on Mar. 30, 2000.

(51) Int. Cl.
*G06Q 40/00* (2006.01)
(52) U.S. Cl. .......................................... 705/36; 705/35
(58) Field of Classification Search .............. 705/10–44
See application file for complete search history.

(56) References Cited

U.S. PATENT DOCUMENTS

| | | | | |
|---|---|---|---|---|
| 5,987,435 | A * | 11/1999 | Weiss et al. ................ | 705/36 R |
| 6,018,721 | A | 1/2000 | Aziz et al. | |
| 6,021,402 | A | 2/2000 | Takriti | |
| 6,321,212 | B1 * | 11/2001 | Lange ....................... | 705/36 R |
| 6,460,021 | B1 * | 10/2002 | Kirksey ....................... | 705/35 |
| 6,601,044 | B1 * | 7/2003 | Wallman .................... | 705/36 R |

FOREIGN PATENT DOCUMENTS

WO   WO 98/53417   11/1998

OTHER PUBLICATIONS

Wall Street Letter:, New York, vol. 30, Iss. 5, p. 5, Proquest ID 25850052, Feb. 2, 1998.*
The Bond Market Association et al, "Cross-Product Master Agreement" and "Cross-Product Master Agreement Guidance Notes", Feb. 16, 2000.
Davis, Warren N., "ISDA Master Agreements—When Reciprocal is Neither Wise Nor Fair", Futures & Derivatives Law Report, vol. 19, No. 11, Feb. 2000, pp. 7-11.
International Swaps And Derivatives Association, "ISDA 1999 Collateral Review", section 2.9.
International Swaps And Derivatives Association, "ISDA Guidelines For Collateral Practitioners", pp. 1-9.
Warburg Dillon Read, "Collateral Management Initiative Workshop", London, Apr. 27, 1999.

* cited by examiner

*Primary Examiner*—Frantzy Poinvil
(74) *Attorney, Agent, or Firm*—Proskauer Rose LLP

(57) ABSTRACT

A computerized system and method to manage and monitor leverage relating to financial transactions whereby counterparty credit risks are enhanced and capital and credit efficiency is promoted by taking a perfected security interest in the counterparty. An aggregate net exposure relating to financial positions held by an identified counterparty is calculated, wherein positions can be held in multiple market segments. A value is determined for collateral dedicated to offset the net exposure. Leverage relating to the ratio of the collateral value and the exposure can be managed to offset the exposure. Monitoring of leverage can be accomplished in real time, or on a predetermined schedule. Exposure can be quantified as a monetary value in a local currency and/or quantified according to market data. In addition the present invention can be used to offset risk associated with online transactions, such as a sale of goods, wherein a currency amount committed to the online transaction is included in a net exposure aggregation. Collateral can be dedicated to offset the net exposure.

27 Claims, 14 Drawing Sheets

| Window | View | Sort | | Preferences | | | | | | | | |
|---|---|---|---|---|---|---|---|---|---|---|---|---|
| Bank View | | Filters on | | State Data | | | Last Updated: Friday March 3rd, 2000 at 13:55 CST | | | | | |
| Customer | | | Product | NRV | GRV+ | GRV- | Margin | Available | Call | Call Held | Call Deficit | Call |
| ABC Company-Unit # 3 ETD | | | CBOT | 3,098.12 | | | 100.500 | N/A | 100.0 | 110.7 | 0 | 0 |
| Status OK | | | CMF | 3 | | | 900.000 | N/A | 100.0 | 779.0 | 100.0 | -10.7 |
| | | | NYSE | 1,629.26 | | | 50.000 | N/A | 100.0 | 0 | 100.0 | 100.0 |
| | | | CBOE | 9 | | | 500.500 | | | | | 0 |
| | | | TOTAL | 4,129.78 | | | 155100 | | | | | |
| ABC Company -Risk ARB Div LLC | | | SWAP | 2,000.65 | | | 8200065 | 0 | | | | |
| | | | EXOP | 2 | | | 6198331 | 0 | | | | |
| | | | EXEWD | 4,923.01 | | | 7983665 | 0 | | | | |
| | | | CASH | 2,912.64 | | | | 0 | | | | |
| | | | TOTAL | 900,008.76 | | | 2238201 | 2873 | | | | |
| ABC Company -Repo Services | | | CBOND | | | | | | | | | |
| LP | | | GBOND | 3,323.83 | | | | | | | | |
| | | | EOTW | 1,184.89 | | | | | | | | |
| | | | TOTAL | 2,890.10 | | | | | | | | |

Ready    ☐ Auto Update Mode    Display Currency: USD ▽    Rate: 1.00

FIG. 8

LEVERAGE MARGIN MONITORING AND MANAGEMENT

CROSS-REFERENCE TO RELATED APPLICATION

This application claims the benefit of Provisional Application entitled "Leverage Monitoring And Management," filed Mar. 30, 2000, bearing the Ser. No. 60/193,187 the contents of which are relied upon and incorporated by reference.

BACKGROUND

The present invention relates to a computerized method of financial risk management. In particular, the present invention relates to a system and method for utilizing collateral for credit risk mitigation and capital preservation through leverage margin monitoring and management ($LM^3$).

A credit risk is the danger that one party will not receive an amount of money it is owed to it by a counterparty because the counterparty defaults on a payment. A credit risk can exist, for example, in a financial relationship involving loans, repurchase agreements, suretyship, derivative transactions, and any situation where a counterparty has an obligation to make payments at a later date. A credit risk can also be associated with a transaction for goods or services, such as an e-commerce transaction. A party supplying a good or service can be at risk until payment is received for the good or service supplied.

In the financial markets, a credit risk is the probability of a counterparty defaulting on its payment obligations to a trading institution. Typically, a credit risk increases as the period of time, which must elapse to reach a calendar date of expected payment increases. Logic applied, holds that a longer period of time increases the possibility of an event transpiring that may cause the inability of the counter party to make payment. Evolving market systems for financial transactions, including the use of computer systems to reach global markets, have placed pressure on traditional trading paradigms. Dealers increasingly desire to free credit lines with existing customers and expand their range of corporate counterparties. Customers often desire to invest with a maximum amount of leverage.

In general, leveraging can include speculating via a business investment through the use of borrowed funds or purchased credit. Standard securities industry leveraging practices can be viewed as a process that compounds a risk. More specifically, leveraging practices can be any process that increases exposure to a source of risk.

Within the field of financial risk management, collateral management leveraging practices include accumulating and deciphering aggregated information representing a counterparty's overall financial standing within a market segment. Aggregated market segment information is used to monitor and measure relative exposure thresholds and the actual value of tangible collateral submitted to custodians by counterparties. Collective information can be used to determine optimal strategies for trading within a market segment including the most effective use of collateral and existing market positions.

In light of the reality that risk is mitigated only to the extent that a counterparty does not default at a time when the collateral has no retained value, appropriate collateral should be selected to offset a particular risk, and the value of the collateral should be regularly calculated in relation to the risk. It would be useful therefore to have an aggregate of collateral associated with a counterparty calculated an applied to offset the risk associated with that counterparty.

SUMMARY

Accordingly, the present invention addresses the above need by allowing a trading institution to enhance counterparty credit risks and promote capital and credit efficiency by taking a perfected security interest in the counterparty. The present invention enables real-time aggregation of counterparty financial activities including relative entity, industry, market segment, product, and transaction analysis by providing a method for the management and monitoring of leverage relating to financial products. The method includes aggregating a net exposure, valuing collateral used to offset the exposure, and managing leverage relating to the collateral for a relative entity having financial positions within multiple market segments.

A computer can be used to manage and monitor leverage relating to financial transactions by identifying an entity and quantifying an aggregate net exposure relating to financial positions held by the identified entity. Positions can be held in multiple market segments. A value can be determined for collateral dedicated to offset the net exposure. Leverage relating to the collateral can be managed to offset the exposure. Monitoring of leverage can be accomplished in real time, or on a predetermined schedule. Exposure can be quantified as a monetary value in a local currency and/or quantified according to market data.

Typically, the value of the collateral is determined from the liquidation price of property underlying the collateral. In addition, multiple types of property can underlie the collateral. An aggregate exposure accumulation can include cross-entity exposure netting, cross product exposure netting and cross agreement exposure netting. A current percentage margin can be calculated, wherein an action plan can be implemented if the current percentage margin falls below a predetermined level.

Financial positions can be based on trading activities conducted in an exchange market or an off-exchange market. Data relating to leverage and exposure can be displayed to a party, and/or counterparty involved, via a user interface machine. Leverage can be managed according to rules specific to conditions and requirements of a particular market segment and managed across market segments. In addition, leverage can be aggregated across market segments and monitized such that unrealized positions from one market sector can cross-find positions in another sector.

Aggregation of net exposure can include cross-product netting and/or cross-agreement netting. The computation of net exposure values can be accomplished separately for financial product groupings. Accumulation of product grouping totals can be accomplished according to a parent entity or as a composite of exposure across market segments.

In another aspect of the present invention, a computer can be utilized to settle a trade consummating a financial deal relating to a particular market segment and monitor exposure levels across market segments. Monitoring can determine if exposure remains within a predetermined tolerance. If the exposure exceeds a predetermined tolerance a communication can be initiated requesting additional collateral.

Similarly, a computer can be utilized to manage leverage relating to financial transactions by identifying a market segment and quantifying an aggregate net exposure resulting from positions relating to the identified market segment. A value for collateral dedicated to offset the net exposure can be determined and used to value exposure of the market segment. For example, a market segment can relate to a specific industry, such that an exposure of the industry can be valued.

In another embodiment, the present invention can be utilized to secure an online transaction by quantifying an exposure relating to a financial transaction executed online and allocating collateral to offset the exposure. Collateral can be reallocated in response to a mitigating event removing or lessening the exposure. An example of a mitigating event can be a sale of goods or other subsequent transaction. A transaction can also be resultant to an online auction.

Other embodiments include a computer system responsive to executable code such that the system functions to cause the above actions. In addition the present invention can be embodied as computer executable program code residing on a computer-readable medium or a digital signal which can cause a computer to perform the above functions Another aspect of the computer includes a method of interacting with a network access device so as to provide leverage management of collateral. Interaction can be accomplished via an interface displayable on an electronic display, wherein the interface includes geographic areas containing: a description of a trading entity, an aggregate exposure resulting from the trading entity having financial positions in multiple market segments and a geographic area containing a recommended action relating to a current percentage margin relating to the aggregate exposure. Typically, an interface will operate on an electronic display such as a computer screen or handheld computing device.

Another embodiment of the present invention can include an interface displayable on an electronic display containing a geographic area with details relating to an online transaction for a sale of goods. Another geographic area can display collateral posted by a party via an online leverage margin monitoring management system, wherein the collateral is posted until consummation of the transaction.

DESCRIPTION OF THE DRAWINGS

FIG. 8 is an exemplary interface screen that can be utilized with the current invention.

DETAILED DESCRIPTION

The present invention provides a computerized system and method for leverage, margin-monitoring and management across financial market segments. The system and method can produce an aggregate exposure value for an entity or hierarchy of entities by quantifying and subsequently offsetting cross-entity, cross product, and cross-agreement exposures. In addition, in order to facilitate fast paced commerce, such as online business to business transactions, various forms of property can be posted for use as collateral. A value can be set for the collateral, wherein the value corresponds to a liquidation price of property underlying the collateral. A computerized system can monitor and manage leverage associated with the relationship between collateral and exposure in real time. The present invention allows a party to use multiple types of available collateral to offset the party's exposure position(s), which in turn can be created by engaging in trading activities related to single products or across multiple market segments.

Margin, collateral, and the practice of collateral management relate to financial instruments or other property to which a monetary value can be assigned. Collateral can be used as security for payment of a debt, performance of a contract, or to secure a financial product transaction. Margin and collateral practices can occur within a formal market segment or an informal market segment. Rules regarding the use of collateral can be specific to a particular market segment in which a financial product transaction occurs. Agreements specifying collateral guidelines can include netting rules that are specific to the conditions and requirements of a particular market segment. Leverage includes a ratio of collateral and exposure. The present invention can aggregate and manage leverage across agreements and market segments.

In the present invention, an obligation or security can be linked to another obligation to secure its performance, such as when an option writer deposits common stock in a company on which an option is written with a broker. The common stock functions as collateral to guarantee performance of the option. The option writer may also deposit securities convertible into the underlying stock or deposit securities that are completely unrelated but have an appropriate value to secure the option transaction.

Figure 1:
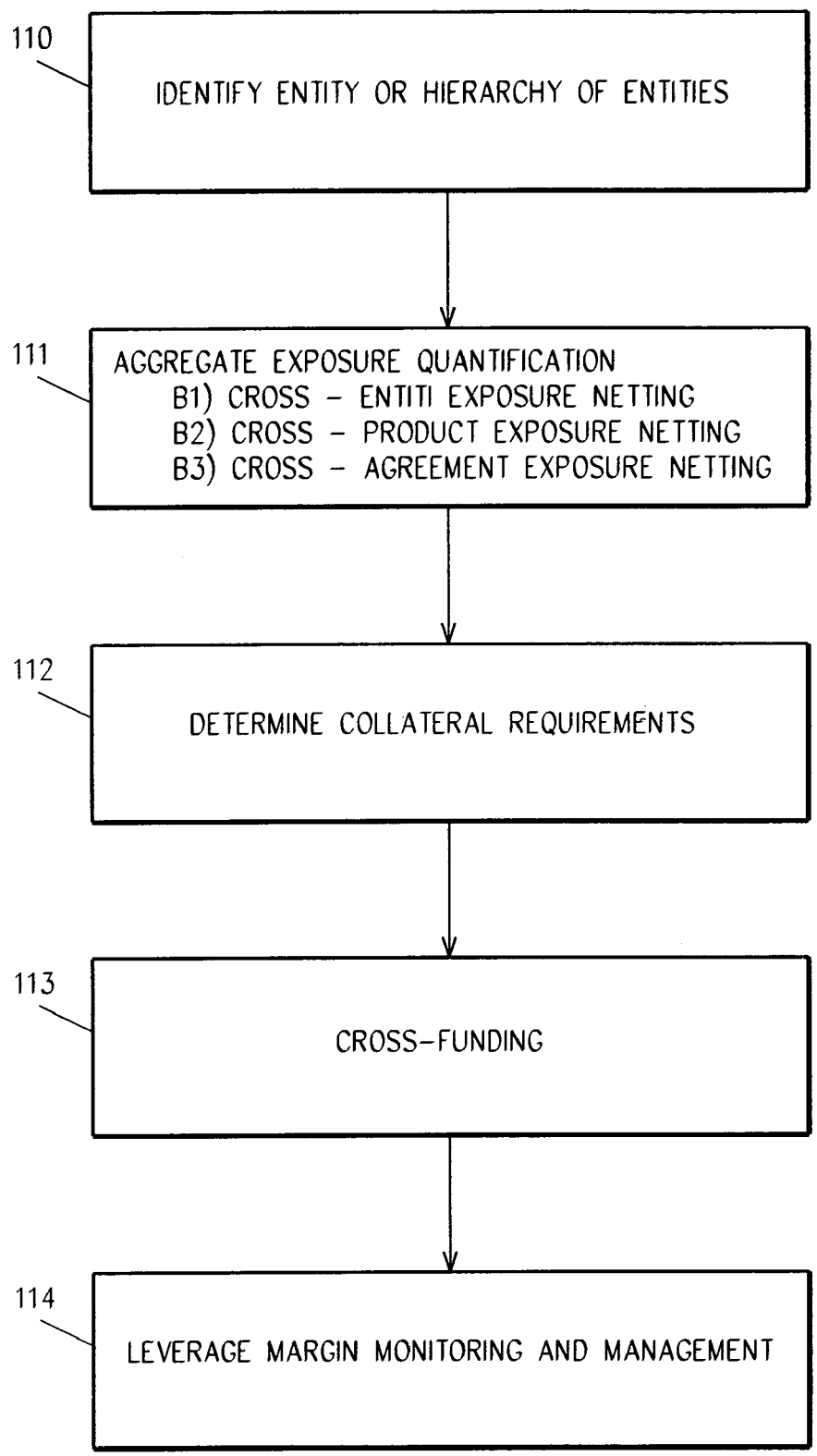
FIG. 1 is a block diagram describing a calculation process for leverage, margin monitoring, and management.

Referring now to FIG. 1, a method incorporating the present invention includes identifying an entity or hierarchy of entities 110 and quantifying an aggregate exposure for the identified entity 111. Quantifying an aggregate exposure 111 can include cross entity exposure netting, cross product netting and cross agreement netting. Based upon the aggregate exposure 111, a determination can be made as to the amount of collateral needed to offset the exposure 112. Cross Funding 113 can be utilized to make full use of all available collateral and other credits to offset the aggregate exposure. A computerized system can be used to continually monitor and manage the leverage position 114, wherein the computerized system continually receives information updating various positions included in the exposure.

An entity 110 can include a corporation, partnership, company, individual, volume purchase group or association formed to take advantage of the economies of scale, or any other legally recognized entity. Similarly, a hierarchy of entities 110 can include a parent-child relationship, such as, a holding company and subsidiaries, associated companies, participating interests, principle entities in financial investment, corporations, partnerships and any other discernable group of entities. Hierarchies can be assembled from any available set of individual entities at the discretion of a user. In one aspect of the invention, a computer analysis of leverage aggregation for analyzing a group of entities can be used as a tool to calculate and measure exposure to an entire industry or market segment.

Party-Counterparty relationships may include business to business, business to individual, or individual to individual pairings. A third party may provide supportive services such as manual or digital quotation, news, analytics, consulting, processing or payments whereby the third party can receive an associated fee for the service provided. However, the third party is not considered part of a financial product contract.

Monitoring and managing a leverage position 114 can include analyzing a leverage position and monetizing unrealized profit positions from one market sector to cross-fund 113 positions that require collateral in another. Monetizing refers to placing a liquidity value upon the leverage position.

Figure 2:
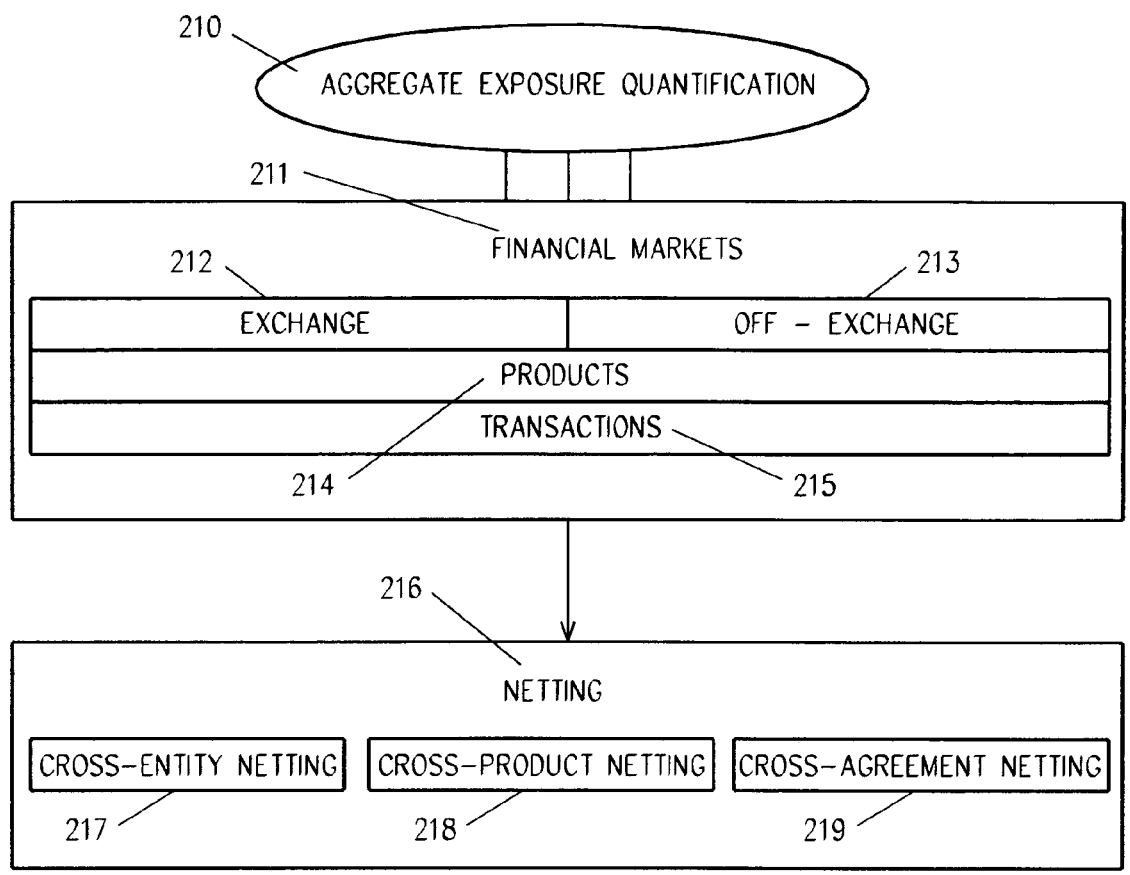
FIG. 2 is a block diagram illustrating Aggregate Exposure Quantification.

Referring now to FIG. 2, Aggregate Exposure Quantification 210 can include information aggregated across financial markets 211. Occurrence and execution of financial product transactions can occur within two distinct financial market segments. Financial market segments 211 can include an organized exchange, ("Exchange" 212) and over the counter markets ("Off Exchange" 213), with products 214 and transactions 215 available through those markets. For example, derivatives can be traded in two environments, the first being organized exchanges and the second being over-the-counter markets, or Off Exchanges 213. More specifically, derivative financial products, such as futures, can be traded on exchanges, and forward contracts and swaps can be traded over-the-counter. Essentially products or products that demonstrate similar behavior can be traded under two different market segments. Similarly, online trading and auctions, including online business to business supply, can be accomplished Off Exchange.

Market segments 211 can be distinguished based upon criteria including: who accepts responsibility for execution of a transaction, associated product listing rules or the lack thereof, reporting obligations, maintenance standards, and other enforced or non-enforced processes, methods, practices or rules of engagement. Transactions can occur in one or both market segment classifications dependent upon associated terms of an agreement.

Exchanges can be an organization, association or group that provides or maintains a marketplace where securities, options, futures, or commodities can be traded. Exchanges include marketplaces such as the New York Stock Exchange (NYSE), Chicago Board Options Exchange (CBOE), Singapore Exchange (SGX), London International Financial Futures Exchange (LIFFE), and the Marche a Terne International de France (MATIF). An exchange can also encompass relative after-hour trading, associate members, automated order entry systems, backdoor listings, clearing members and clearing houses, commodity exchanges, futures exchanges, regional exchanges, registered broker/dealers, third markets, fourth markets, and other emerging markets.

A third market can include over the counter trading of listed securities among institutional investors and broker/dealers for their own accounts, rather than as agents for investors. A fourth market can include direct trading of large blocks of securities between institutional investors through a computer network, rather than on an exchange. An institutional investor can include an entity with large amounts to invest, such as investment companies, mutual funds, brokerages, insurance companies, pension funds, investment banks and endowment funds.

Exchange 212 traded instruments can have specified borrowing limitations and required collateral (margin requirements) which are designed to protect a member firm (usually a brokerage firm) from another member's default. The exchange guarantees both sides of the transaction by requiring all firms to post margin and clear through a central clearing function.

Exchange environments require corporations of listed instruments or securities to follow rules of engagement and practice. For instance, stock exchanges can have specific quantitative and qualitative listing and maintenance standards, which are stringently monitored and enforced. Companies listed on an exchange have reporting obligations to the exchange and a direct business relationship exists between the exchange and its listed companies.

An Off Exchange 213 can encompass an informal marketplace wherein financial or other products, including tangible or intangible property, goods, or services are traded directly between two parties, in a Party ($1^{st}$ party) to Counterparty ($2^{nd}$ party) relationship. Off Exchange products can also include retail and business to business sales of manufactured products and professional services. Similar to exchanges, margin requirements can be utilized between parties to protect from a counterparty default. A financial institution can guarantee a transaction between parties by requiring each party to post margin until the transaction clears.

Additionally, investors can finance part of a position in underlying assets through borrowing. For example, borrowing can be accomplished through an investor's broker. An investor can purchase common stock through a registered broker by putting up a fraction, such as half, of the purchase price of the stock. A brokerage firm can arrange for an investor to borrow the other half of the purchase price. An investor's contribution can be referred to as a "margin deposit". A ratio (percentage) of the investor's contribution to the purchase price can be referred to as a "percentage initial margin requirement". This ratio is a loan to value ratio that can be calculated and tracked, such that when a predetermined limit is reached, additional actions can be implemented. For example, for a $100 stock, the required initial margin deposit can be $50, and the percentage initial margin requirement is $50/$100 or 50%. This percentage initial margin requirement creates a loan to value limitation of 50%. A credit arrangement may require that a loan to value ratio, such as 30%, be maintained.

Subsequent to a purchase, market price of an asset will typically change. For example, the market price may rise. In which case, an investor may seek to liquidate an account by selling stock included in the account, and repaying borrowing associated with it. Not considering interest the investor may owe relating to the borrowing, and continuing the example above, the investor would then have $125−$50=$75. This $75 liquidation value can be called account equity. At any time, an investor can calculate a current percentage margin of an account, by dividing the account equity of the account by the concurrent market price of the stock. To follow our example, if a stock with a $100 purchase price rises to $125, the percentage margin is $75/$125=60%.

A market can also set rules that require an investor to maintain at least a certain percentage margin after inception. This percentage maintenance margin requirement can allow for a loan to value ratio lower than the percentage initial margin requirement. For example, if a stock with a $100 purchase price falls to $75, the percentage margin is $25/$75=33.33%. If the percentage margin falls below a percentage maintenance margin requirement, an action plan can be implemented, such as requiring the investor to either put up additional funds or to sell the stock within a predetermined time period, such as, a few days.

Margin requirements are meant to insure that an investor meets their obligations. In the case of taking a loan to purchase stock, a margin assures a broker that an investor will not default on the loan. In addition to the margin deposit, the broker can hold as collateral a purchased property, such as stock. This arrangement allows a stock price to fall by an amount of the associated margin deposit without the possibility of exposure amounting to default. If the margin ratio falls below a certain amount, by agreement, the creditor usually has the right to sell off the position to insure that the creditor doesn't suffer losses due to investor non-performance.

An Off Exchange 213 can include any forum for trading products or services not provided for in a formal Exchange 212. An example of an Off Exchange 213 financial market segment is an Over the Counter (OTC) market. An OTC market enables trading of financial products including a security or other instrument that is not traded on an exchange or a market segment that is not part of an organized exchange. An Off-Exchange market can also offer products that have the exactly the same characteristics as exchange products.

Securities that are not traded on an Exchange 212 due to an inability to meet listing requirements can be directly negotiated by parties. The negotiations can take place via computer networks and by phone. OTC financial market products, including securities and instruments, can be created with provisions allowable by law and acceptable to counterparties involved.

OTC markets can primarily rely on computer-posted bid-ask quotes and telephone communication to assure that retail customers negotiate favorable prices. A regulatory body, such as, the National Association of Securities Dealers (NASD), the Bank of England (BOE), or the Securities Exchange Commission (SEC) monitor some of the OTC activities. Examples of computer systems, methods, and associated practices can include; bulletin boards, auction markets, Autex, Forex, intrastate offerings, NASDAQ, National Market System, National Securities Trade Association, off-board, outside brokers, outside market, Pink Sheets, stock markets (informal), street brokers, third markets, fourth markets, ECN, Joint Back Offices, and other emerging markets.

Typically, Off Exchange 213 market segments will not have to practice rules of engagement and practice. For instance, an OTC market can consist of unlisted securities. Issuers of these securities may have no reporting obligations to any federal regulatory authority. There are no minimum required standards, and no business relationship exists between third party service providers such as quotation services (OTC Bulletin Board, Pink Sheets) and the issuers.

Another form of Off Exchange 213 is embodied in the growing profusion of online sales and auction forums. The present invention provides a method and system to secure an online transaction and monitor aggregate exposure with associated collateral through a system mutually available to both the party and the counter-party. Collateral managed by a centralized collateral management system can be used to offset exposure created by an online transaction. The centralized margin management system can dedicate collateral to offset the exposure created by a transaction until a subsequent transaction or other mitigating event removes or lessens the exposure. Similarly, the centralized margin management system can reallocate collateral in real time or otherwise further manage a party's leverage as that leverage is made available. In one sense, a centralized margin management system can therefore be used to limit risk associated with an online transaction(s). In another sense, the centralized margin management system can continually monitor an exposure created and facilitate quick management of collateral dedicated to offsetting that exposure as the exposure is mitigated.

Referring now again to FIG. 2, Aggregate Exposure Quantification 210 can include netting that reaches cross entity, cross product and cross agreement. As discussed above, according to the present invention, an entity can include a single legal entity, a hierarchy of entities, or any other combination of entities. Cross-Entity Netting 217 can include more than one entity grouped together in order to mutually share exposure and collateral positions.

Cross-Product Netting 218 enables capturing positions on multiple related or non-related products traded in Exchange 212 and Non Exchange 213 forums. Cross Product Netting 218 can include, for example, netting foreign exchange (FX) options, Equity options, FX cash, interest rate (IR) swaps, equity options, stock loans, stock borrowings, repurchase agreements (REPO), equity repos, synthetic swaps and emerging products. Netting in the present invention allows for the aggregation of positions on these types of products, whereby exposure can be offset by polarized positions either within a market segment or across segments.

Cross-Agreement Netting 219 enables combining exposures associated with multiple agreements. Cross-Agreement Netting 219 can include, or supercede, for example, collateral agreements, such as: exchange margin agreements, ISDA Master, IFEMA, ISLA, OSLA, PSA, ISMA and emerging agreements.

Cross Funding 113 can include monetizing unrealized profit positions from one segment to fund positions that require collateral under a different segment or agreement. The present invention offers cross entity netting 217 and cross agreement netting 219 exposure from positions requiring collateral with margin resulting from realized profit positions.

Figure 3:
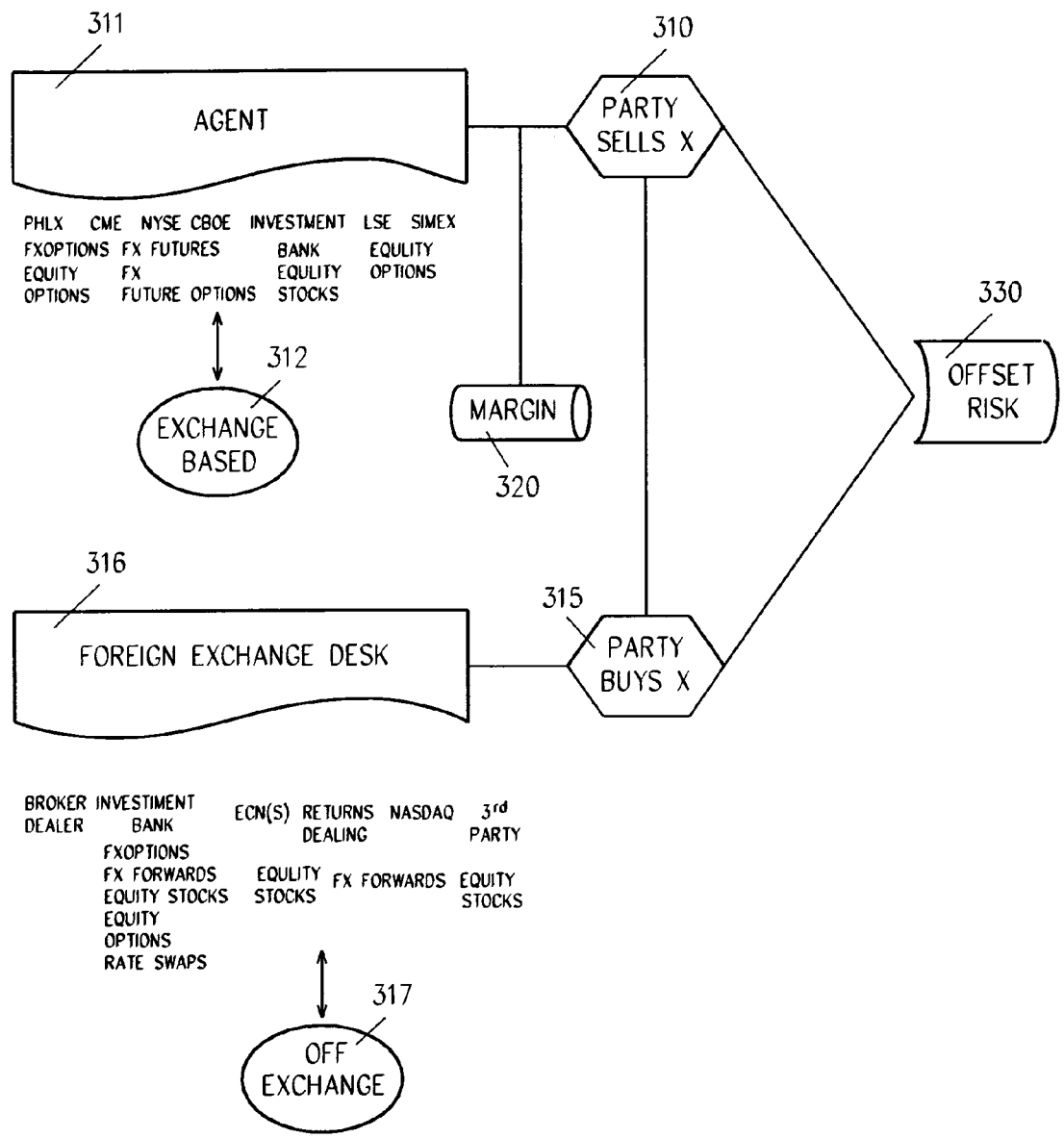
FIG. 3 is a block diagram illustrating Cross Funding to offset risk.

Referring now to FIG. 3, an example of aggregating a net exposure is illustrated. If a party sells item X 310 on an exchange 312, through an agent 311 such as an investment bank, the party will be required to maintain a margin 320 by the exchange 312, this margin requirement will be passed through the investment bank agent 311 to the party. If the party also buys item X 315 off exchange 317 through the same investment bank via a foreign exchange desk 316, the party will not be required to post margin as the credit exposure is on the investment banks ability to deliver. As the party has both bought X 315 and sold X 310 through two different mediums, the party maintains a net position of zero, having locked in a profit or loss, whereby no risk remains. Traditionally however, the party would still be required by the exchange to maintain margin 320 since there is no offsetting position within that particular exchange 312 segment. The present invention enables offsetting risks 330 and applying otherwise ignored realized or unrealized profits as collateral during the normal course of conducting business.

Figure 4A:
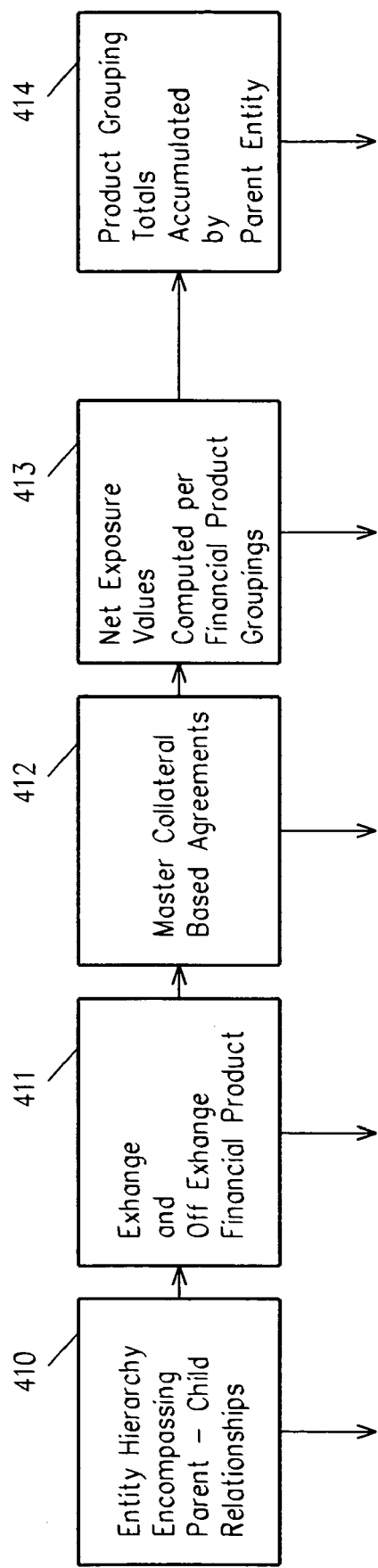
FIGS. 4A and 4B illustrate an example of aggregation including net exposure values computed separately for multiple product groupings.
Figure 4B:
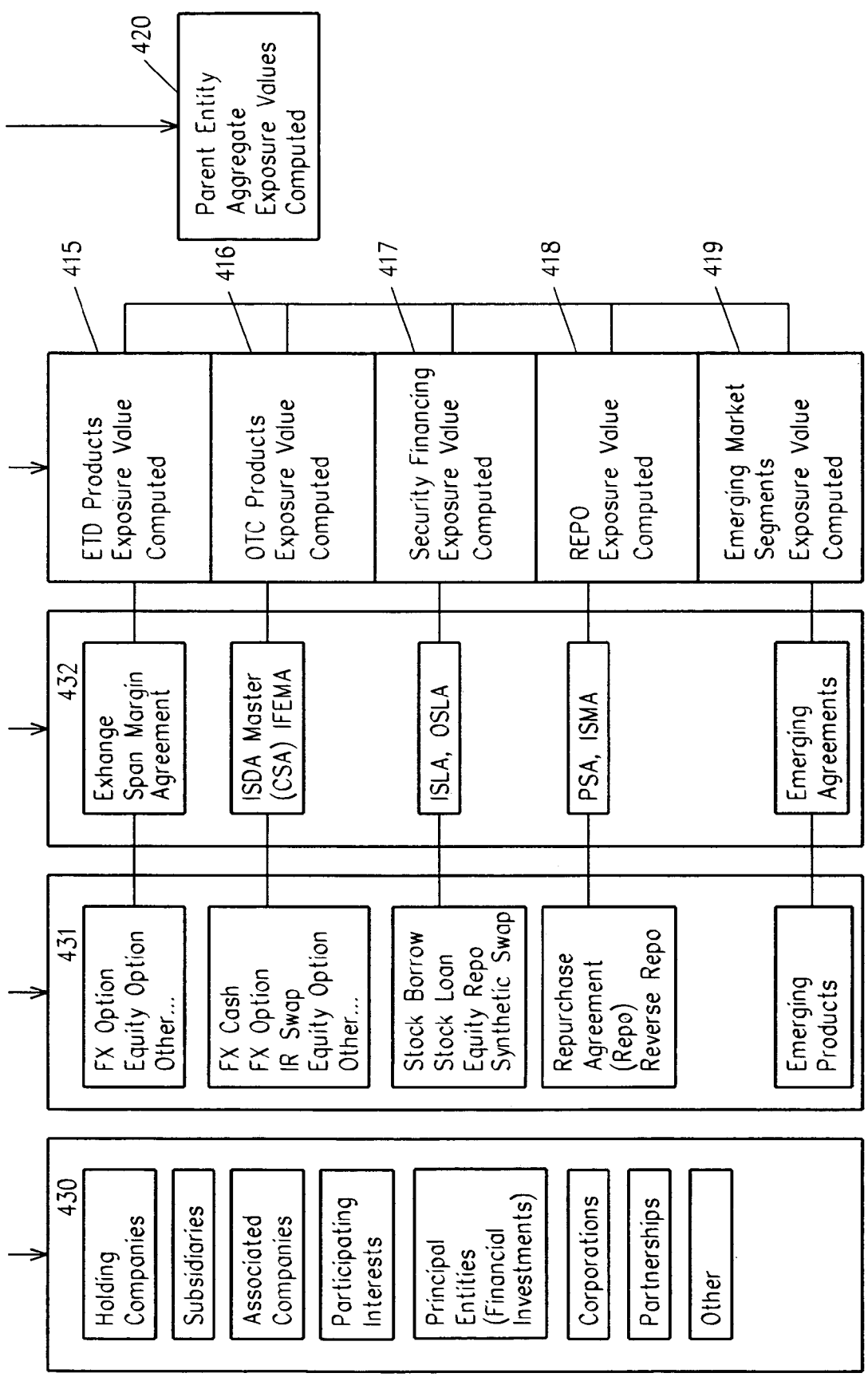

Referring now to FIGS. 4A and 4B, an example of one particular implementation of the present invention, wherein Net Exposure Values are computed for various financial product groupings, is illustrated. As illustrated, an entity, or entity hierarchy 410 can include various aspects of a holding company 430, including subsidiaries, associated companies, participating interests, principal entities in financial investments, corporations, partnerships, purchasing associations, and any other group of entities.

Products involved in a collateralized transaction can include Exchange and Off Exchange Products 411. Particular examples of Exchange and Off Exchange Financial Products 411 can include, (FX) options, Equity options, FX cash, interest rate (IR) swaps, equity options, stock loans, stock borrowings, repurchase agreements (REPO), equity repos, synthetic swaps, and emerging products 431. Master Collateral Based Agreements 412 can include the terms a party and counter-party have agreed to regarding the type of collateral, margin ratios, closeout ratios, threshold amounts, minimum transfer amounts, rounding conventions, and other data specified under the agreement. Specific examples of Collateral Based Agreements 432 can include an International Swaps and Derivatives Association (ISDA) Master with associated Credit Support Annex (CSA), International Foreign Exchange Master Agreement (IFEMA), Global Master Repurchase Agreement (GMRA), Master Repurchase Agreement (MRA), documents under the Global Master Repurchase Agreement (MSRA) and emerging agreements, such as the Cross Product Master Agreement (CPMA) also known as a "Master Master" that is being pushed forward by an international consortium including the Bond Market Association, ISDA, British Bankers Association, and others.

In the example of the present invention illustrated in FIGS. 4A and 4B, net exposure values are computed separately for financial product groupings 413. Specific examples of financial products groupings can include Exchange Traded Derivatives (ETD) products 415, Over The Counter (OTC) products 416, Security Financing 417, Repurchase Agreements (Repo) 418, and emerging markets 419. Product grouping totals can be accumulated according to a parent entity 414 such that the parent entity aggregate exposure can be computed 420 with a simple sum of the product grouping totals 414. Collateral may not necessarily be utilized across groupings. Under certain circumstances, collateral accounts may be shifted in order to cover shortfalls within a grouping from overages in another or even monetizing unrealized profits to cover shortfalls. Closeout events of this type of aggregation can be done in accordance with a collateral based agreement.

Figure 5A:
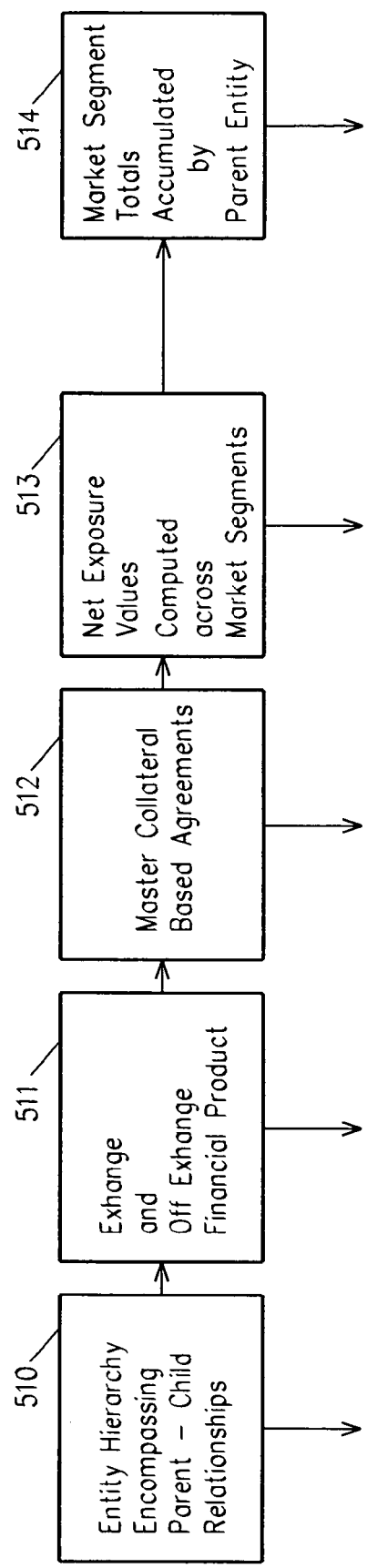
FIGS. 5A and 5B illustrate an example of aggregation including net exposure values computed according to market segments.
Figure 5B:
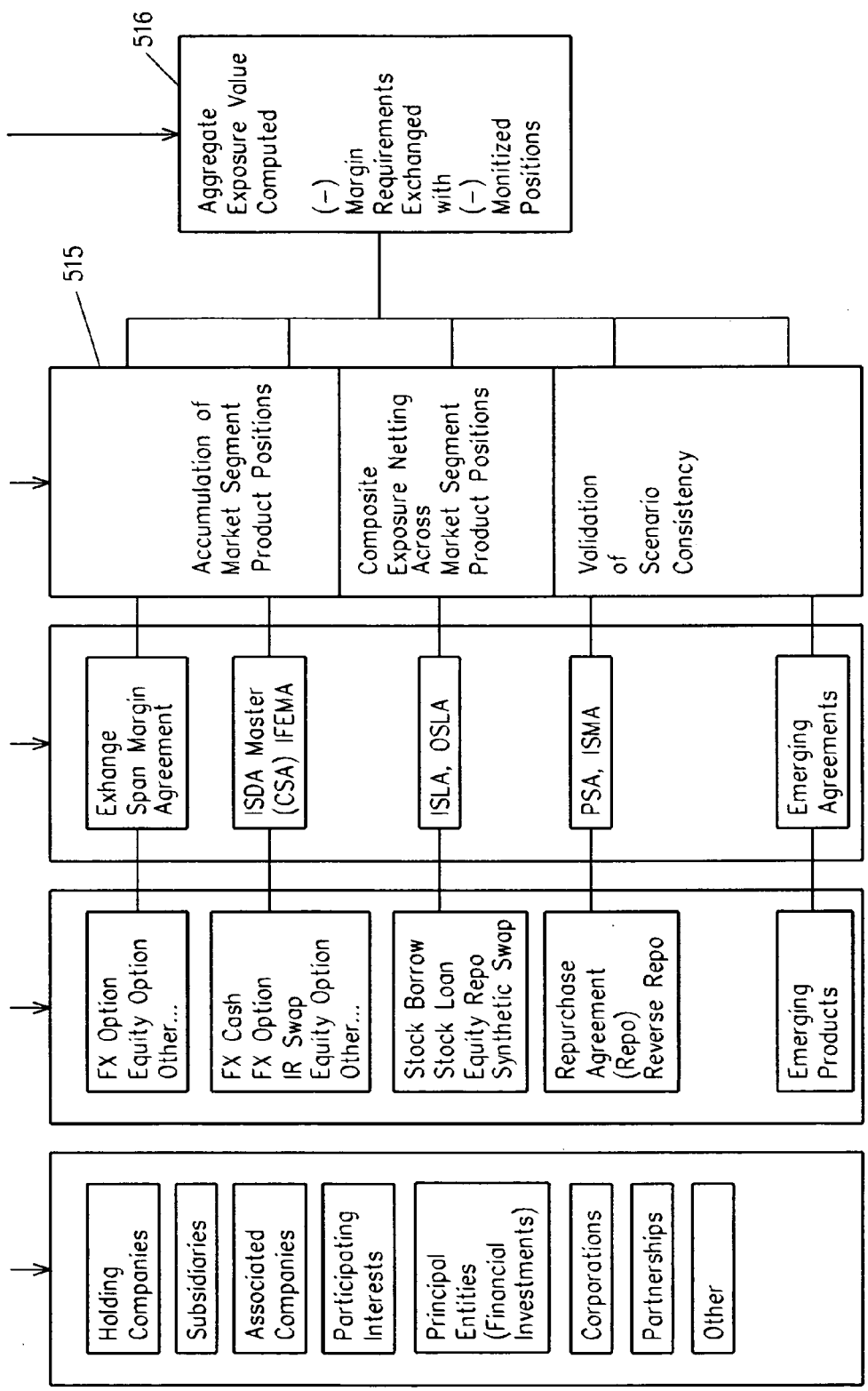

Referring now to FIGS. 5A and 5B, another (and differentiating) embodiment of the present invention is illustrated, wherein Net exposure values are computed across market segments 513. Similar to the example above, an entity, or hierarchy is identified 510. Exchange and Off Exchange products are also identified 511, as are Master collateral Based agreements 512. However, in this embodiment, the system tracks and accumulates market product segments forming a composite exposure across the market segments 515. The aggregate exposure Value is then computed 516 and Margin Requirements are determined. Closeout events of this type are done in accordance with an over-riding agreement such as a Mater-Master.

Figure 6:
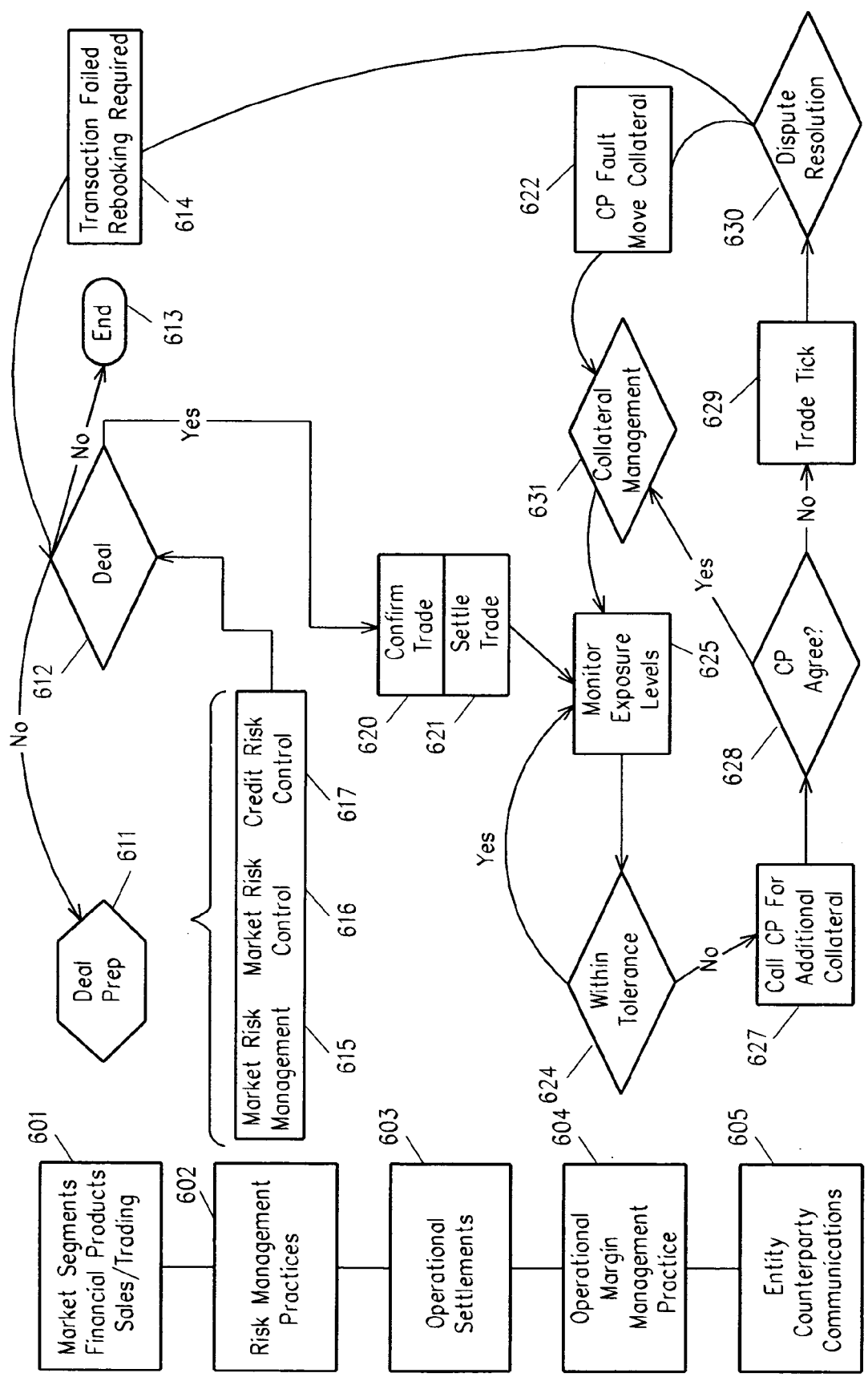
FIG. 6 illustrates a trading flow of a system embodying the present invention.
Figure 7A:
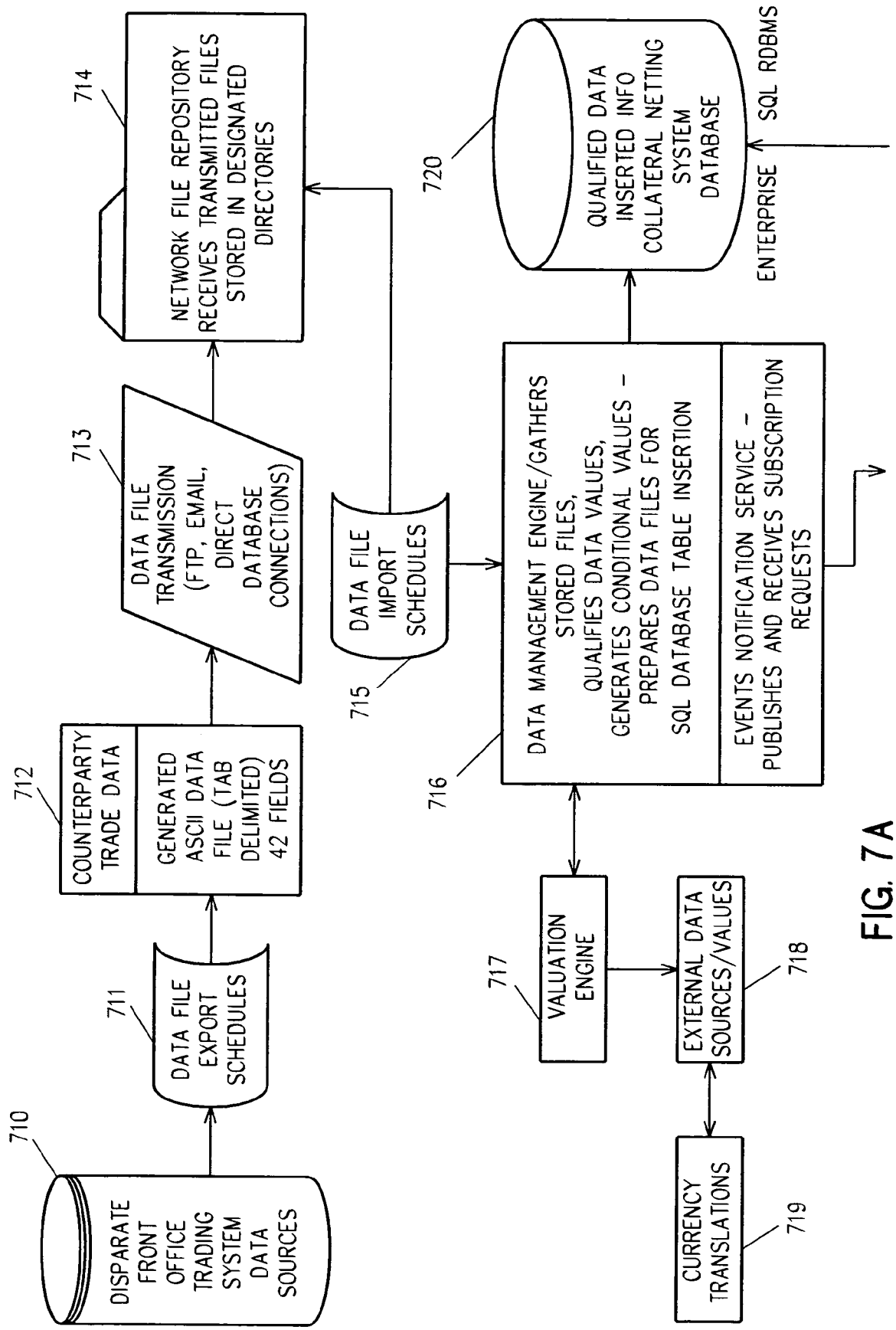
FIGS. 7A, 7B, 7C, and 7D illustrate a specific example of collateral management practice functions and entity-counterparty communications.
Figure 7B:
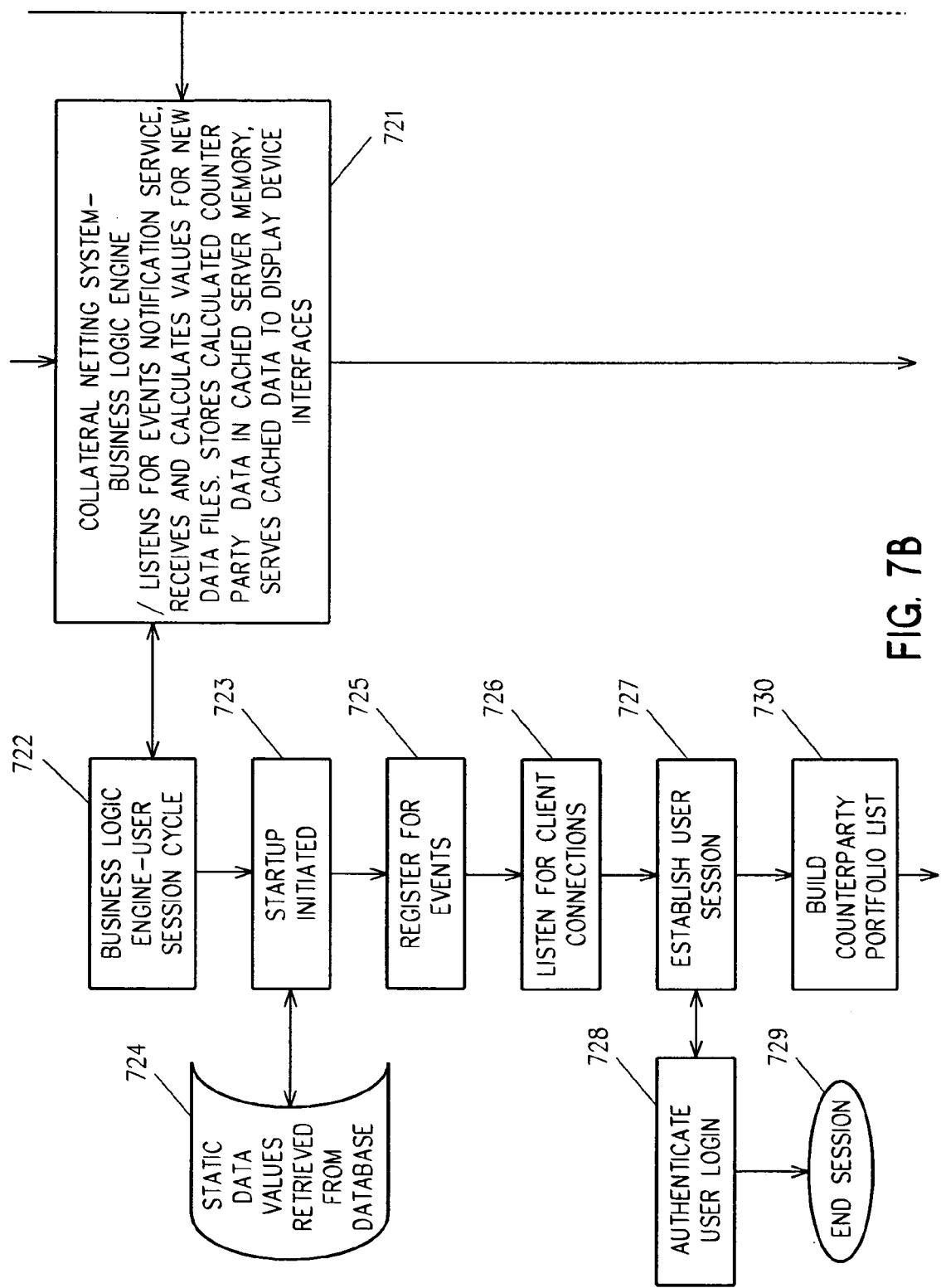
Figure 7C:
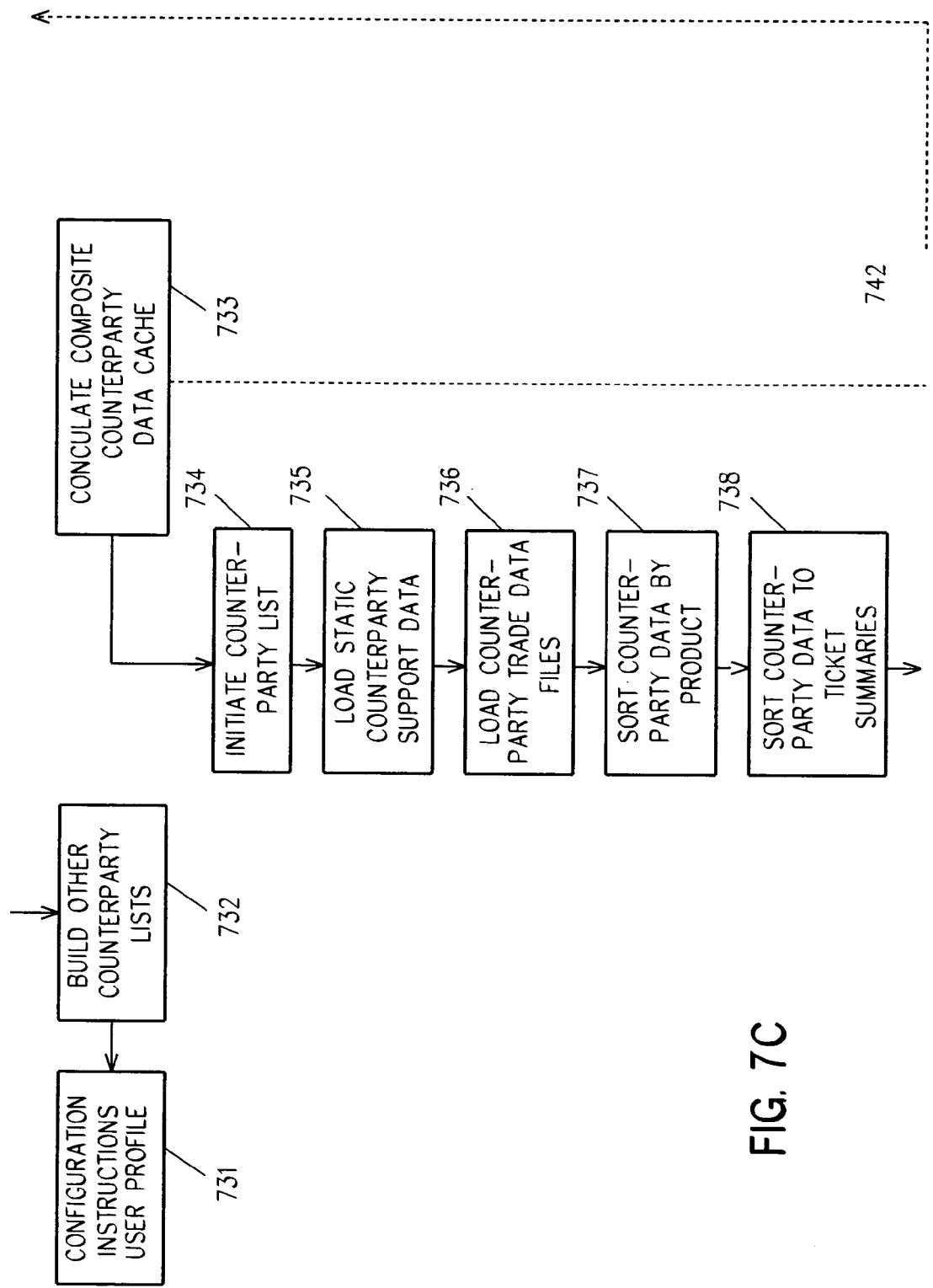
Figure 7D:
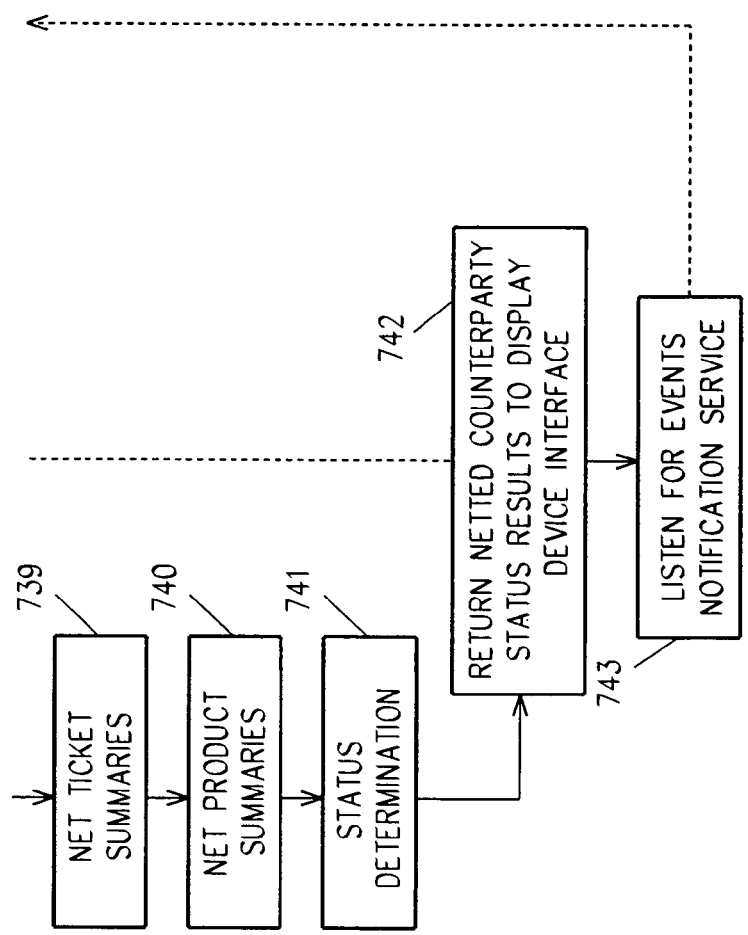

Referring now to FIG. 6, a trading flow of a system embodying one implementation of the present invention is illustrated. Functional aspects 601-605 of the system are indicated alongside the various steps in the flow 611-631. Deal preparation 611, relating to a particular market segment product 601; can be initiated at a trading desk or other operator putting together a deal 612. After deal preparation 611 is complete, the proposed deal is forwarded to risk management practice 602 to insure that the proposed deal is within the guidelines of a bank, or other institution, processing the transaction. The proposed deal can then be approved or denied through market risk management 615, market risk control 616, and/or credit risk control 617. Once approved, a proposed deal becomes a deal 612 and is forwarded to operational settlements 603 functions.

Operational settlements 603 can include confirmation 620 and settlement 621 of a trade consummating a deal 612. Following the settlement 621, exposure levels can be monitored 625 within an operational margin management practice function 604. Exposure levels can be continuously monitored 625 and tested to determine if the exposure remains within a predetermined tolerance 624. Should the predetermined tolerance be breached, an entity-counterparty communications function 605 is initiated wherein the counterparty can be contacted for: calling of additional collateral, return of collateral, pledge of collateral, or a callback of collateral 627. If the counterparty agrees 628 to the collateral call, a collateral management process 631 can be invoked for the purpose of tracking collateral assets such as cash, deeds, bonds, stock certificates, and other forms of pre-defined acceptable collateral.

A collateral management process can begin with the creation of instructions that are forwarded to a party's collateral custodian. The instructions are typically derived based upon rule sets that are set up for each counterparty and agreements that have been negotiated. The collateral custodian can then inform the party when the settlement has occurred and the counterparty has actually delivered the assets. At this point, the party has taken a perfected interest in the collateral.

During a period commencing with instruction creation and ending with settlement, the collateral is considered pending. The value of the collateral is computed in real time or at defined intervals both on a market basis and on a worth basis. The market basis can be simply the market value of the security. The worth basis can be a rule-based computation which factors in liquidity risk, concentration risk, and other factors that may important to the valuing institution. The collateral management process can also be responsible for tracking the disposition of collateral. For example, in order to determine rebates or credits on dividends, coupon payments; etc arising from partial ownership periods due to collateral movements. The collateral management process can also be used to track status of "re-hypothecated" or "on-lent" collateral, wherein collateral taken in by a party may be posted with another counterparty. The system can track ownership such that a proper owner receives dividends, coupons and such.

Additionally, the system can be used to track interest accrual for certain types of collateral such as cash currency. The collateral management process can report all values into a Leverage Margin Management and Monitoring application. If the counterparty does not agree to the collateral movement, a trade tick 629 analysis can be implemented whereby a detailed study of a counterparty's activities can be made transaction by transaction. Dispute resolution 630 can follow the trade tick analysis 629.

Should dispute resolution 630 determine that the counterparty is at fault, collateral is moved 622 to maintain an acceptable exposure level. If additional collateral cannot be maintained, closeout proceedings may be initiated by the party. If the dispute resolution 630 determines a transaction fault by the party, then rebooking is required 614 and the process loops back to the deal stage 612. After rebooking it can be re-determined if additional collateral is required by the counterparty.

One specific implementation of the operational collateral management practice method 604 and the entity-counterparty communications 605 is illustrated in detail in FIGS. 7A, 7B, 7C, and 7D. Disparate Front Office trading systems can source data into the present invention. Source data can include a combination of data relating to equities including stocks, options, indexes and complex derivatives; fixed income products, including treasury products including foreign exchange options and foreign exchange forwards; securities finance; ETD; e-commerce trading data and other tradable units. A data file export schedule can be accomplished, for example, using file transfer protocol, email or direct database connections. A $LM^3$ system can act as a file repository and receive the transmitted files 714. A data file import scheduler 715 can initiate the importation of the data files into an $LM^3$ system 716. Transactions and market conditions can also be transmitted as they occur and forwarded to the invention for incorporation into the aggregation engine.

The Data Management Engine 716 can perform multiple functions, including: receiving data from a collateral management system, qualifying, translating, supplementing data values and preparing data files for transfer to a database. For Example, the data Management Engine 716 gathers incoming transactions from disparate front office risk management system data sources 710. Transaction data is read and interpreted, values are computed, and standard and supplemental data attribute tags are generated and appended to the transaction records. Standard data attribute tags are based up pre-existing transaction data. Supplemental data attribute tags are generated based upon pre-existing data, additional data sources, and interpretive application programs. Examples of standard data attribute tags include notional/face value, Theoretical values (MTM), Delta values, product codes, buy-sell indicators, and entity identifiers. Examples of supplemental data attribute tags include source systems, source locations, product types, product sub-types, agreement types, netting levels, transaction associations, and exchange-off exchange indicators. Data files can be imported into the Data Management Engine 716 as determined by a data file import scheduler 715. The scheduler 715 can be programmed according to the particular needs of the data being imported. Scheduling can range from infrequent (daily, weekly) to incorporating data as it is reported to the engine (real time).

Data qualification can be facilitated with a valuation engine 717. The valuation engine 717 can use external data 718 and other market data in its processes to accurately value data received into the Data Management Engine 716. The Data Management Engine 716 can also include an event notification service to publish and receive subscription requests.

Market data can include descriptive and numerical information such as hardcopy, voice correspondence or other audio input that can be processed by human cognition, electronic communications, or other conveyance relating to current rate and price information for a commodity, security or other goods and services traded on an Exchange or Off Exchange market segment. Market data can also include extraneous information in various forms used for purposes of forecasting future bid and ask prices, analyzing current transaction occurrences, and historical trends. Sources of market data can include public and private news and data wires, corporate press releases, corporate income and earnings reports, governmental reports and changes to rates by the federal government. Market data can also include indicative buy and sell prices surveyed from market participants, as well as a theoretical or calculated value of an option derived from a data feed, interest rate or volatility calculation.

A user session can be facilitated through a business logic engine 722. Startup initiation 723 can access static data from a database 724 and also register for events 725 with other aspects of the system. Event registration can be accomplished with an event service program. The user session cycle 722 can also listen for client connections 726 and establish a user session 727. If desired, the user session can be authenticated via a user login routine 728. A counter party portfolio list 730, or other counterparty list 732, can be built for the user session according to instructions stored in a user profile 731.

An aggregation function can be performed by calculating a composite counterparty data 733 and displaying a netted counterparty status result to a user 742 via a user interface. The method of performing aggregation can vary based on user defined rule sets. Users can make selections from menu choices within an interactive interface. Menu selections define relationships between entities, industry sectors, market segments, agreements, exchange types, products, and transactions. More specifically, rule sets define the precedence for Leverage Margin Management and Monitoring aggregation and netting practices. Transaction data received from the Data Management Engine 716 and previously tagged with Leverage Margin Management and Monitoring standard and supplemental data attributes, is interpreted and aggregated within the Business Logic Engine 721 based upon the rule sets. For example, users can select pre-defined aggregation methods or create an aggregation method. These methods may include but are not limited to definition of: netting Exchange and Off Exchange products (see FIG. 3), netting of product sets—such as offsetting options with cash or forward products, netting in accordance with ISDA agreement guidelines, or in the simplest case—not allowing negative exposures to offset positive exposures. The system can load static counterparty support data 735. The system can also load counterparty trade data 736. Data can be sorted according to product 737, ticket summaries 738 or other relevant criteria. Net ticket summaries 739 can be used to generate net product summaries. A status determination 741 can be made according to net ticket summaries 739, with netted counterparty status results displayed on a display device interface 742. A display device can include a computer terminal, a handheld device, a video screen, an LCD display, or any other known display that can be associated with a computer system.

Referring now to FIG. 8, a user interface relating to a Leverage Margin Monitoring Management system can be displayed on an electronic display device, such as those associated with a computer, a handheld computing device such as a Palm Pilot™, or other network access device display. The GUI can include multiple geographic areas or portions of a display, wherein each geographic area includes specific data processed by a Leverage Margin Monitoring and Management system. For example, geographic areas can include: a Window Controls area 810 with commands relating to interface window functions, such as print, close, minimize, or other window functions; a Party-Counterparty View mode selector 811 allowing a choice of views between party data and counterparty data; a Party-Counterparty View mode Indicator 812; a filters on status 813, which indicates if any Filters have been applied to the data; a Popup Box 814 for setting Sort Preferences, a Popup Box for Setting General Application preferences such as font size, font type, default Size, and default location 815; a Product or Market Segregation area 816; an area to indicate if data is current or stale 817; a Net Replacement Value area 818; a Gross Replacement Value area 819; a Required Margin for Product or Market area 820; a area indicating an available Face Value Deal Size for current Collateral Held amount 821; an area indicating a Current Amount of Collateral Required per Product, Market, or Market Segment 822; an timestamp area indicating the time of the last update to the data presented 823; an area displaying Collateral Confirmed Settled from a Custodian 824; an area displaying Collateral Pledged but not yet confirmed settlement from a Custodian 825; an area indicating a Difference of Collateral Required and Collateral Held 826; an area indicating an Amount of Call/Callback post Rounding and Minimum Transfer amounts 827; a Customer Status Indicator area displaying a description of a customer entity or a hierarchy of related entities 828; an Application Status Feedback Area 829; a Tick Box to receive Real Time Updates 830; an area indicating a choice box for translating monetary values into different currencies 831, such as shown with all values in US Dollars; or areas displaying other data relating to the aggregation of collateral values and margin management.

Other embodiments of a user interface relating to a Leverage Margin Monitoring Management system can include areas containing data relating to an online transaction and collateral dedicated to that transaction. For example, a user interface can contain areas displaying the details of an online business to business transaction relating to a sale of goods, wherein collateral for the transaction is dedicated via an online Leverage Margin Monitoring Management system. Collateral values for the transaction can be displayed indicating collateral posted by a party until consummation of the transaction.

Figure 9:
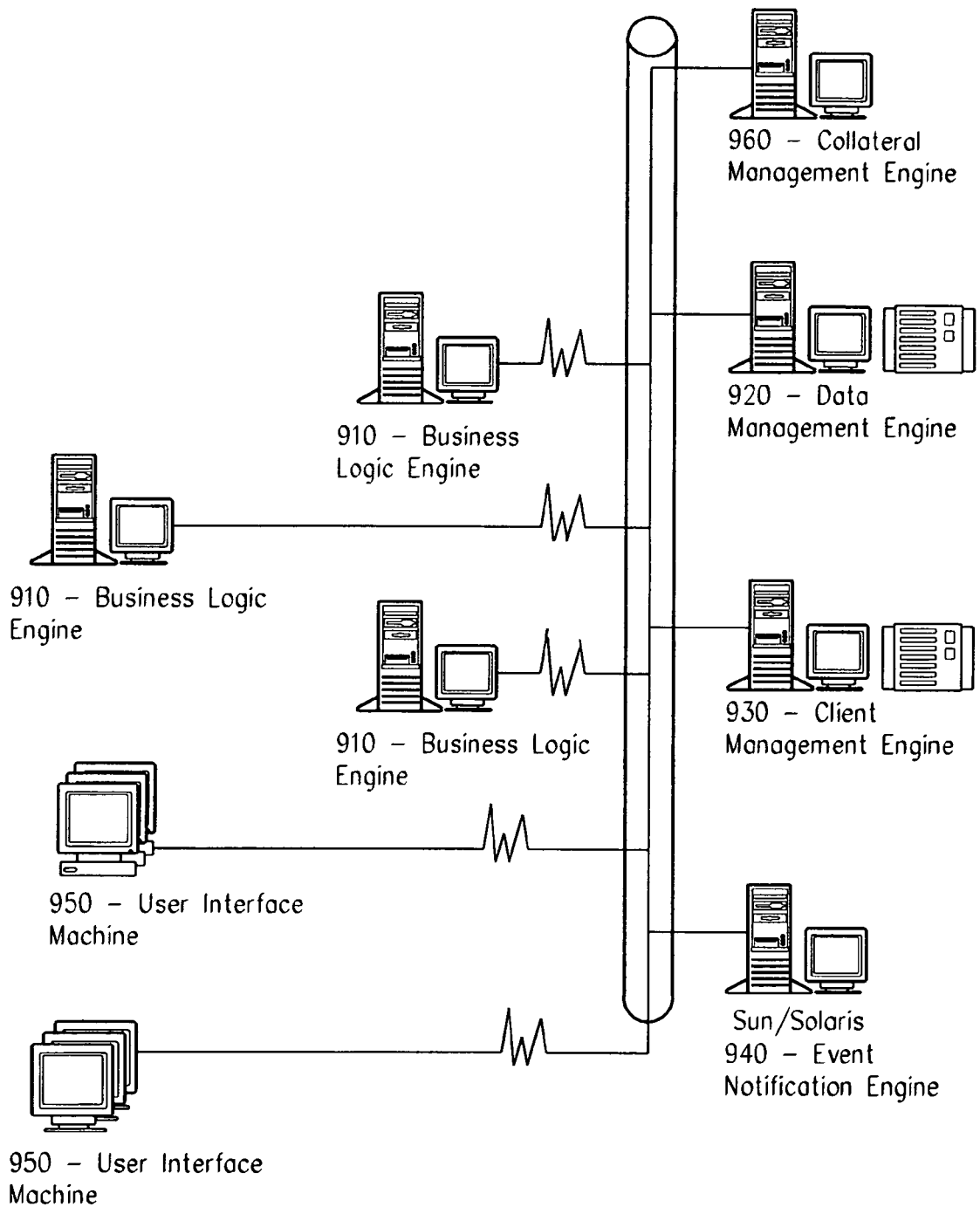
FIG. 9 is a diagram representing an exemplary system usable with the present invention.

Referring now to FIG. 9, a Leverage Margin Monitoring Management System can include computer processing engines 910-960, which perform various computing functions. The computer processing engines 910-960 can be commercially available computer platforms, such as the Sun/Solaris™ platform, the IBM™ platform or any other platform capable of executing computer programs. Typically, a computer processing engine 910-960 will include a processor operable in conjunction with software resident in a memory or other storage. For example, a Business Logic Engine 910, a Data Management Engine 920, a Client Management Engine 930 and an Event Notification Engine 940 can be included in a Leverage Margin Monitoring Management System and hosted on Sun/Solaris™ or IBM™ compatible computers.

A computer system acting as a Data Management Engine 920 can be programmed to schedule importing and exporting of market data, transaction data, and other data in real time or based on pre-defined schedules. The Data Management Engine 920 can qualify, structure, and format data types according to Application Program Interface (API) and data mapping specifications. The Data Management Engine 920 can also establish and subsequently process conditional values such as theoretical values, haircuts, other algorithmic based calculations based on market conditions and perform currency translations. In one embodiment, a data management engine 920 can include an open database architecture scheme with script driven processes and events. The Data Management Engine 920 can sort, index, and insert processed data into data storage mediums capable of housing SQL or other relational databases.

The Data Management Engine 920 can also host World Wide Web compliant Web pages enabling the definition, transmission, validation, and interpretation of data between applications and/or between organizations. It can generate transmission reports encompassing time, date, and/or status validations. In one embodiment, the Data Management Engine 920 can employ Event Notification Engine 940 services to publish and receive information to and from other operational management systems and personnel, third party systems, telephony systems and devices, chat systems and services, and paging and other handheld computing systems services and devices. Publication performed by the Event Notification Engine 940 can include transmitting data in a digital signal.

A Business Logic Engine 910 listens for Event Notification Engine messages to receive new or updated data from the data management engine 920. The Business Logic Engine 910 can perform calculations in accordance with rules encompassed by user defined rule sets. The rules act upon both standard and supplemental data attributes contained within the data. The rule sets can be predetermined to be within accordance of Umbrella, Master-Master, Master Superstructures, and singular netting agreements or can be set by the user to define the rules on an ad-hoc basis. Data can be cached in server memory of a Business Logic Engine 910 to facilitate real time access to the data. The Business Logic Engine 910 can also receive messages from an Event Notification Engine 940 as a result of the Client Management Engine 930 communicating interface subscription and publishing requests. For example, a user can perform hypothetical data exercises through a graphical user interface. Upon exercise completion, the Event Notification Engine 940 can message the Business Logic Engine 910. Data, including associated worksheets for future reference, notation and modeling, can be subsequently stored in a memory cache included in the Business Logic Engine 910.

A Client Management Engine 930 can validate client configuration instructions, which define or determine a type of interface and an associated display device seeking connectivity, for example, a Web Browser or Thin/Thick Client on a Personal Computer or Handheld Computing Device. The Client Management Engine 930 can also listen for Event Notification Engine 940 messages which indicate that the Business Logic Engine 910 has new or updated data for interface presentation. Upon user/client authentication, cached data processed by the Business Logic Engine 910 is served to various types of interfaces. The Client Management Engine 930 can be responsible for serving portfolio preferences such as industry sectors, market segments, entities, product lines, and specific transaction related information based on specified client interface configuration parameters. The Client Management Engine 930 can enable the presentation of varying degrees and granularity of information.

The Event Notification Engine (940) can provide a real time messaging service which publishes and receives subscription requests, effectively inter linking other system engines executing separate functions. A user interface machine 950 can include a personal computer, laptop, terminal, handheld computing device, wireless communicator or any electronic device capable of displaying data. The user interface machine can display data processed by the engines in a Leverage Margin Monitoring Management system, for example, the interface screen of FIG. 8.

The Collateral Management Engine 960 can be embodied as a computerized system for managing and tracking collateral held in custodial accounts. The Collateral Management Engine 960 can monitor different forms of collateral on which a value can be placed. Additionally, for interest bearing collateral types, such as cash, the Collateral Management Engine 960 can accrue interest on a simple or compound basis. It can also have the ability to apply appropriate rules for corporate actions for equity or debt securities. The Collateral Management Engine 960 can utilize rule based workflow management in order to perfect a security interest counterparty collateral. The Collateral Management Engine 960 can maintain static data in order to provide default payment instructions and certain agreement level data necessary to create an instruction. The instruction can be passed on to a custodian for collateral movement.

For control purposes, a two level commit can be required for certain instructions such as changing default payment instructions and for moving collateral to or from an account. For example, instructions created by one person can be "authorized" by another in order for the instruction to be forwarded to a custodian. Instructions can be forwarded through a number of mediums, for example the Collateral Management Engine 960 can provide a facility for creating export files for uploading into external Custodial systems. In addition, it can automatically fax or e-mail instructions once the instructions have been authorized. The Collateral Management Engine 960 can also track the status of collateral movement instructions throughout the settlement process. In one embodiment, it can include tracking the disposition of the collateral at any given time. Timestamps can be kept on updates relating the status of the collateral through various stages of the process, thereby providing an on-line history. Time stamps can be especially important for an "on lending" or re-hypothecation process.

Subsequent to the creation, authorization, settlement and tracking of an instruction, the Collateral Management Engine 960 can determine an appropriate market value and apply an appropriate set of discounting rules to derive an appropriate haircut value for the collateral. The Collateral Management Engine 960 can provide a number of ways in which information can be extracted from the system. A direct user interface can be utilized with which users can look up a specific counterparty, custodian, or collateral on an ad-hoc basis. Predefined reports can also be made available. Reports can be in an electronic format or automatically generated via print or facsimile. In addition, an export facility can be utilized in order to provide information to other systems. In the case of an $LM^3$ process, the Collateral Management Engine 960 can forward appropriate information on to the Data Management Engine 920.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Computers in a Leverage Margin Monitoring and Management system may be connected to each other by one or more network interconnection technologies. For example dial-up lines, token-ring and/or Ethernet networks, lines, asynchronous transfer mode links, wireless links and integrated service digital network (ISDN) connections may all be combined in a network. Other packet network and point-to-point interconnection technologies may also be used. Additionally, the functions associated with separate processing and database servers may be integrated into a single server system or may be partitioned among servers and database systems that are distributed over a wide geographic area.

A number of embodiments of the present invention have been described. Nevertheless, it will be understood that various modifications may be made without departing from the spirit and scope of the invention. For example, a computer can include a personal computer executing an operating system such as Microsoft Windows™ or Unix™, as well as software applications. User computers can also be terminal devices, a palm-type computer, or any network access device that adheres to a point-to-point or network communication protocol such as the Internet protocol. Other examples can include TV WEB browsers, terminals, and wireless access devices such as a Palm organizer. A client computer may include a processor, RAM and/or ROM memory, a display capability, an input device and hard disk or other relatively permanent storage. Accordingly, other embodiments are within the scope of the following claims.

What is claimed is:

1. A method for management and monitoring of leverage relating to financial transactions, the method comprising steps of:
   identifying an entity;
   identifying at least one market segment in which the entity holds financial positions;
   quantifying an aggregate net exposure relating to the financial positions held by the identified entity, wherein the financial positions are held in multiple products and multiple market segments and the aggregate net exposure is quantified using cross-product netting and cross-agreement netting;
   quantifying said aggregate net exposure across the identified market segment or segments;
   determining a value for collateral dedicated to offset the exposure;
   and managing leverage relating to the collateral to offset the exposure,
   wherein at least one of the steps is performed by a computer.

2. The method of claim 1, wherein the identified market segment or segments relate to specific industries.

3. The method of claim 1, wherein the aggregate net exposure is quantified according to market data using a calculation of the median of multiple values.

4. The method of claim 1, additionally comprising managing the leverage according to rules specific to conditions and requirements of a particular identified market segment.

5. The method of claim 1, wherein the leverage is managed across market segments.

6. The method of claim 1, wherein the entity comprises a volume purchase group.

7. The method of claim 1, wherein managing leverage comprises monetizing unrealized positions from at least one of the identified market segments to cross-fund positions in another market segment.

8. The method of claim 1, additionally comprising computing net exposure values separately for financial product groupings and accumulating product grouping totals according to a parent entity.

9. The method of claim 1, additionally comprising accumulating market product segments forming a composite of exposure across market segments.

10. The method of claim 1, wherein the exposure relates to a particular entity.

11. The method of claim 1, wherein the exposure relates to a particular industry.

12. A method of managing collateral for financial transactions, the method comprising the steps of:
    settling a trade consummating a financial deal relating to a particular market segment;
    monitoring exposure levels across market segments to determine if exposure remains within a predetermined tolerance by performing the steps of:
    identifying an entity;
    identifying at least one market segment in which the entity holds financial positions;
    quantifying an aggregate net exposure relating to the financial positions held by the identified entity, wherein the financial positions are held in multiple products and multiple market segments and the aggregate net exposure is quantified using cross-product netting and cross-agreement netting;
    quantifying said aggregate net exposure across the identified market segment or segments;
    determining a value for collateral dedicated to offset the exposure; and
    initiating communication for additional collateral resultant to the exposure exceeding a predetermined tolerance,
    wherein at least one of the steps is performed using a computer.

13. The method of claim 12, wherein the market segments relate to specific industries.

14. A method for the management and monitoring of leverage relating to financial transactions, the method comprising the steps of:

identifying entities;

identifying a market segment in which the entities hold financial positions;

quantifying an aggregate net exposure resulting from the financial positions held by the identified entities, wherein the financial positions are held in multiple products and multiple market segments and the aggregate net exposure is quantified using cross-product netting and cross-agreement netting;

quantifying said aggregate net exposure across the identified market segment or segments;

determining a value for collateral dedicated to offset the net exposure; and managing leverage related to the collateral to offset the exposure, wherein at least one of the steps is performed using a computer.

15. The method of claim 14 wherein the market segment relates to a specific industry.

16. The method of claim 14, wherein the leverage is managed across the identified market segment or segments.

17. A computer system for managing leverage relating to a financial position, the system comprising:
a processor;
a storage medium;
programmable code stored in the storage medium and operative with the processor to:
identify an entity or hierarchy of related entities;
identify at least one market segment in which the entity or hierarchy of entities hold financial positions;
quantify an aggregate net exposure relating to the financial positions of the entity or hierarchy of entities, wherein the financial positions are held in multiple products and multiple market segments and the aggregate net exposure is quantified using cross product and cross-agreement netting;
quantify said aggregate net exposure resulting from the identified entity, or hierarchy of related entities, across the identified market segment or segments;
determine a value for collateral dedicated to offset the exposure; and
manage leverage of the collateral.

18. The system of claim 17, wherein the leverage is managed across the identified market segments.

19. Computer executable program code residing on a computer-readable medium, the program code comprising instructions for causing the computer to:
identify an entity;
identify at least one market segment in which the entity holds financial positions;
quantify an aggregate net exposure relating to the financial positions held by the identified entity, wherein the financial positions are held in multiple products and multiple market segments and the aggregate net exposure is quantified using cross-product netting and cross-agreement netting;
quantify said aggregate net exposure across the identified market segment or segments;
determine a value for collateral dedicated to offset the exposure;
and manage leverage relating to the collateral to offset the exposure.

20. A method of interacting with a network access device for providing leverage management of collateral, the method comprising the steps of:
accessing a server on a computer network;
receiving data relating to an exposure, wherein the exposure is resultant to an aggregation of financial positions held by an entity in multiple market segments;
receiving data relating to the exposure in specific market segments;
determining a value for collateral dedicated to offset the exposure using cross-agreement netting and cross-product netting by performing the steps comprising:
identifying an entity;
identifying at least one market segment in which the entity holds financial positions;
quantifying an aggregate net exposure relating to the financial positions held by the identified entity, wherein the financial positions are held in multiple products and multiple market segments and the aggregate net exposure is quantified using cross-product netting and cross-agreement netting;
quantifying said aggregate net exposure across the identified market segment or segments;
and managing leverage created by the ratio of the collateral to the exposure,
wherein at least one of the steps is performed by a computer.

21. A computer system comprising one or more computers, said one or more computers having a screen comprising:
a first area containing a description of a trading entity;
a second area containing an aggregate exposure resulting from the trading entity having financial positions in multiple market segments that is calculated on a computer using cross-product netting and cross-agreement netting; and
a third area containing a recommended action relating to a current percentage margin relating to the aggregate exposure, wherein said recommended action is determined using information in said second area.

22. The computer system of claim 21, additionally comprising a Party-Counterparty view mode selector.

23. The computer system of claim 21, additionally comprising an area displaying a net replacement value.

24. The computer system of claim 21, additionally comprising an area displaying a required margin for a product or market area.

25. The computer system of claim 21, additionally comprising an area displaying collateral confirmed settled from a custodian.

26. The computer system of claim 21, additionally comprising an area displaying collateral pledged but not yet confirmed settlement from a custodian.

27. The computer system of claim 21, additionally comprising an area displaying a choice box for translating a monetary value into different currencies.

* * * * *

UNITED STATES PATENT AND TRADEMARK OFFICE
CERTIFICATE OF CORRECTION

PATENT NO. : 7,577,601 B1
APPLICATION NO. : 09/597881
DATED : August 18, 2009
INVENTOR(S) : Rademacher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1380 days.

Signed and Sealed this

Fourteenth Day of December, 2010

David J. Kappos
*Director of the United States Patent and Trademark Office*